(12) United States Patent
Hamabe

(10) Patent No.: US 6,915,139 B2
(45) Date of Patent: Jul. 5, 2005

(54) AREA DESIGNING APPARATUS AND METHOD FOR MOBILE COMMUNICATION SYSTEM

(75) Inventor: Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 666 days.

(21) Appl. No.: 09/842,741

(22) Filed: Apr. 25, 2001

(65) Prior Publication Data

US 2001/0036824 A1 Nov. 1, 2001

(30) Foreign Application Priority Data

Apr. 28, 2000 (JP) ........................................ 2000-130613

(51) Int. Cl.$^7$ ................................................ H04Q 7/20
(52) U.S. Cl. ...................... 455/522; 455/69; 455/63.1; 455/62; 455/446; 455/422.1
(58) Field of Search ........................ 455/69, 522, 63.1, 455/62, 422.1, 446, 67.11, 67.13, 423–425, 226.1–226.3

(56) References Cited

U.S. PATENT DOCUMENTS

| | | | |
|---|---|---|---|
| 5,293,640 A | | 3/1994 | Gunmar et al. |
| 5,561,841 A | * | 10/1996 | Markus ...................... 455/446 |
| 6,097,957 A | * | 8/2000 | Bonta et al. ................. 455/446 |
| 6,253,065 B1 | * | 6/2001 | Palmer ..................... 455/67.13 |
| 6,356,758 B1 | * | 3/2002 | Almeida et al. ............. 455/446 |
| 6,473,624 B1 | * | 10/2002 | Corbett et al. ............... 455/522 |
| 6,477,376 B1 | * | 11/2002 | Carter ......................... 455/446 |
| 6,549,781 B1 | * | 4/2003 | O'Byrne et al. ............. 455/446 |
| 2002/0187801 A1 | * | 12/2002 | Vanghi ....................... 455/522 |

FOREIGN PATENT DOCUMENTS

| | | |
|---|---|---|
| JP | 5-308319 | 11/1993 |
| JP | 05-320638 | 12/1993 |
| JP | 6-244782 | 9/1994 |
| JP | 9-074378 | 3/1997 |
| JP | 11-008878 | 1/1999 |
| JP | 11-252634 | 9/1999 |
| WO | WO-90/10342 | 9/1990 |
| WO | WO-93/15591 | 8/1993 |
| WO | 99/26439 | 5/1999 |
| WO | WO 99/26439 | 5/1999 |

OTHER PUBLICATIONS

Japanese Office Action dated Mar. 14, 2002 (w/ English translation of relevant portion).

Kalofonos et al., "Modeling the Hand-off Mechanism Effect on the In-Cell and Other Cell Interferences of IS-95 Cellular CDMA Networks", GTE Laboratories Incorporated, Waltham, MA, pp. 1273–1277 (1999).

* cited by examiner

*Primary Examiner*—William Trost
*Assistant Examiner*—Sharad Rampuria
(74) *Attorney, Agent, or Firm*—Dickstein, Shapiro, Morin & Oshinsky, LLP (57) ABSTRACT

An area designing method for a mobile communication system, comprising steps of: placing a plurality of communicating mobile stations corresponding to traffic distribution information; deciding a base station to which each of the mobile stations is radio linked; calculating a transmission power of a desired wave signal that each base station transmits to each of the mobile stations that are radio linked thereto; successively selecting one from a plurality of evaluation positions in a state that each of the base stations is transmitting the desired wave signals; and calculating a reception power of a desired wave signal that an evaluation mobile station placed at each selected evaluation position receives from the base station that is radio linked thereto and reception powers of interference wave signals that the evaluation mobile station receives from the base station that is radio linked thereto and from each of the other base stations.

28 Claims, 6 Drawing Sheets

AREA DESIGNING APPARATUS AND METHOD FOR MOBILE COMMUNICATION SYSTEM

BACKGROUND OF THE INVENTION

1. Field of the Invention

The present invention relates to an area designing apparatus and method for a mobile communication system, the area designing apparatus having a means for calculating a transmission power of a signal transmitted between a base station and each of a plurality of mobile station.

2. Description of the Prior Art

A mobile communication system provides a communication service using a plurality of base stations disposed in the service area thereof. To improve the quality of the communication service, the mobile communication system has an area designing apparatus. The area designing apparatus evaluates the communication quality of a signal transmitted between each of a plurality of mobile stations and one of the base stations. Corresponding to the evaluated result, the communication service provider increases the number of base stations and changes designed radio parameters.

The area designing apparatus randomly places a plurality of communicating mobile stations in a radio zone of a specified base station corresponding to traffic distribution information so as to designate the base station that is radio linked to each of the mobile stations. The area designing apparatus calculates the transmission power of a signal transmitted between the base station and each of mobile stations that are radio linked thereto and evaluates the communication quality of a signal transmitted between the base station and each of the plurality of mobile stations corresponding to the calculated result.

To consider the case that a signal that a specified mobile station transmits interferes with a signal that another mobile station transmits, a plurality of mobile stations are placed. In addition, since the transmission power of a signal transmitted between the base station and each mobile station varies depending on the position of each mobile station, the mobile stations are placed corresponding to traffic distribution information. Thus, the communication quality of the communication service is evaluated in consideration of the traffic distribution.

Figure 1:
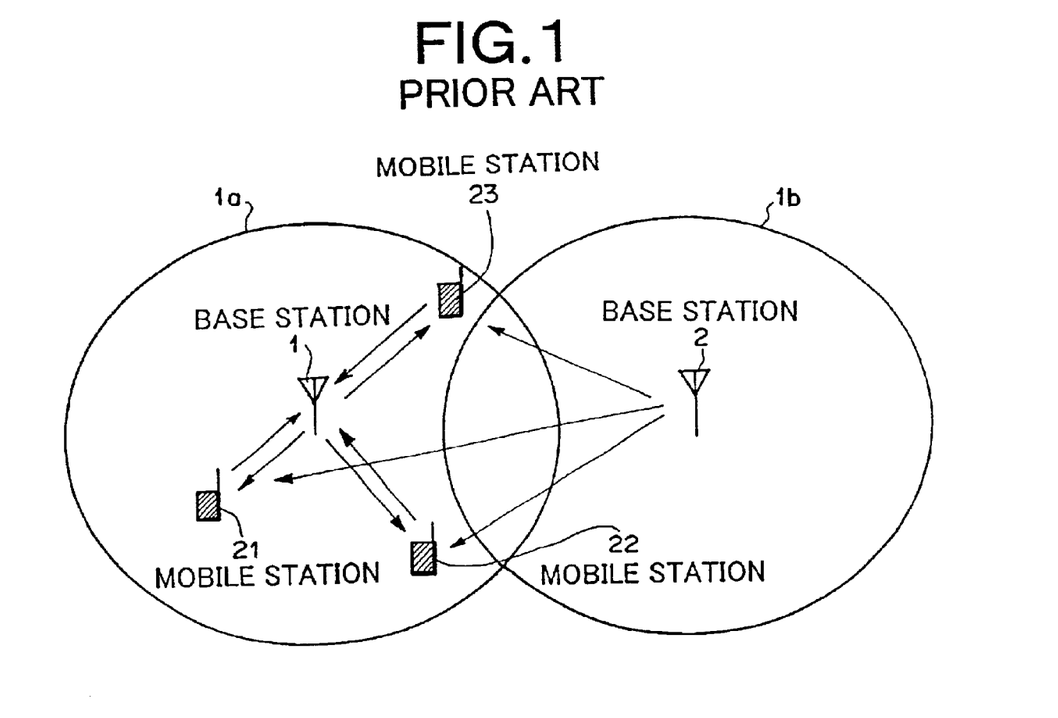
FIG. 1 is a schematic diagram for explaining the theory of the evaluation of a communication quality of a signal transmitted between each of a plurality of mobile stations and a base station, the evaluation being performed by an area designing apparatus used in a conventional mobile communication system.

FIG. 1 is a schematic diagram for explaining the theory of the evaluation of the communication quality of a signal transmitted between each of a plurality of mobile stations and a base station, the evaluation being performed by an area designing apparatus of a conventional mobile communication system. FIG. 1 shows base stations 1 and 2 disposed in the service area of the communication service provider. The base stations 1 and 2 have radio zones 1$a$ and 1$b$, respectively. Mobile stations 21 to 23 are placed in the radio zone 1$a$. In reality, there are other base stations and mobile stations along with the base stations 1 and 2 and the mobile stations 21 to 23 shown in FIG. 1.

It is assumed that the mobile communication system uses code division multiple access system (CDMA) that uses one frequency band for each of the up link line and the down link line.

When each of the mobile stations 21 to 23 is in communication and radio linked to the base station 1, the area designing apparatus calculates the transmission power of a signal transmitted from the base station 1 to each of the base stations 21 to 23 and the transmission power of a signal transmitted from each of the mobile stations 21 to 23 to the base station 1.

In addition, corresponding to the calculated result, the area designing apparatus calculates the desired wave power of each desired wave signal and the interference wave power of each interference wave signal transmitted between each of the mobile stations 21 to 23 and the base station 1 and obtains (each desired wave power/each interference wave power). The communication quality is proportional to (each desired wave power/each interference wave power). For example, when the ratio of mobile stations that do not satisfy a predetermined threshold value of (each desired wave power/each interference wave power) is large, the communication provider disposes a new base station and changes the designed radio parameters so as to improve the communication quality.

In this case, to obtain the desired wave power and the interference wave power, the area designing apparatus designates the transmission power of a signal transmitted through each radio line to an constant initial value. In that state, the area designing apparatus randomly and successively selects each radio line and changes the transmission power thereof so that the communication quality of a signal transmitted through the selected radio line satisfies a predetermined target value while the transmission power does not deviate from the range of the predetermined maximum transmission power and the predetermined minimum transmission power. After the area designing apparatus have selected all the radio lines and changed the transmission powers thereof, since a change of the transmission power of a specified radio line causes the interference wave powers of the other radio lines, the communication qualities of the radio lines other than the last selected radio line may deviate from the desired target value even if the transmission powers do not deviate from the range of the maximum transmission power and the minimum transmission power.

For a radio line that has been earlier selected, even if the transmission power of the radio line is in the range between the maximum transmission power and the minimum transmission power, the difference between the communication quality and the predetermined target tends to become large. Thus, to decrease the difference, each radio line is repeatedly selected and the transmission power thereof is repeatedly increased and decreased so as to converge the transmission power and evaluate the communication quality. Thus, the mobile communication system using the code division multiple access method should evaluate the communication quality in such a manner.

In addition, the communication quality of each mobile station placed in an area with a predetermined size is evaluated. As a result, the deterioration ratio which is a ratio of mobile stations that do not satisfy a predetermined level is obtained. The communication qualities at positions of a plurality of mobile stations and the deterioration ratios in a plurality of areas are displayed in colors as visual information on a map.

However, the communication qualities of mobile stations can be evaluated only at random positions thereof corresponding to traffic distribution information. The number of positions at which communication qualities can be evaluated is less in an area where the traffic density is low than another area where the traffic density is high. In addition, the positions at which the traffic qualities are evaluated are randomly designated. Thus, it is desired to improve the area designing apparatus so as to evaluate communication qualities at positions designated at any constant intervals regardless of the traffic density. In addition, the same number of evaluation results of communication qualities is required in each area in order that the communication quality of each mobile station is evaluated in each area having a predetermined size and the ratio of mobile stations that do not satisfy a predetermined level of communication qualities is obtained. However, since the mobile stations are placed at random corresponding to the traffic distribution information, the number of evaluation results of the communication qualities obtained in the individual areas fluctuates. Thus, the statistical reliability of the deterioration ratio calculated in each area varies corresponding to the traffic density.

SUMMARY OF THE INVENTION

Therefore, an object of the present invention is to provide an area designing apparatus that is used for a mobile communication system and that allows communication qualities at positions designated at any equal intervals to be evaluated regardless of a traffic density. In addition, another object of the present invention is to provide an area designing apparatus that is used for a mobile communication system and that allows a deterioration ratio to be obtained with a constant statistic reliability in each area with any size.

According to a first aspect of the present invention, there is provided an area designing apparatus for a mobile communication system, comprising: means for placing a plurality of communicating mobile stations corresponding to traffic distribution information; means for deciding a base station to which each of the mobile stations is radio linked; means for calculating a transmission power of a desired wave signal that each base station transmits to each of the mobile stations that are radio linked thereto; means for successively selecting one from a plurality of evaluation positions in a state that each of the base stations is transmitting the desired wave signals; and means for calculating a reception power of a desired wave signal that an evaluation mobile station placed at each selected evaluation position receives from the base station that is radio linked thereto and reception powers of interference wave signals that the evaluation mobile station receives from the base station that is radio linked thereto and from each of the other base stations, wherein communication quality at each evaluation position is evaluated corresponding to the calculated reception power of the desired wave signal and the calculated reception powers of the interference wave signals.

According to a second aspect of the present invention, there is provided an area designing apparatus for a mobile communication system, comprising: means for placing a plurality of communicating mobile stations corresponding to traffic distribution information; means for deciding a base station to which each of the mobile stations is radio linked; means for calculating a transmission power of a desired wave signal that each of the mobile stations transmits to the base station that is radio linked thereto; means for successively selecting one from a plurality of evaluation positions in a state that each of the plurality of mobile stations is transmitting the desired wave signal; means for calculating a reception power of a desired wave signal that the base station that is radio linked to an evaluation mobile station placed at each selected evaluation position receives from the evaluation mobile station and reception powers of interference wave signals that the base station that is radio linked to the evaluation mobile station receives from the mobile stations other than the evaluation mobile station, wherein the communication quality at the evaluation position is evaluated corresponding to the calculated reception power of the desired wave signal and the calculated reception powers of the interference wave signals.

In the area designing apparatus according to the first or second aspect, a random deviation amount may be added to a propagation loss of a signal transmitted between the evaluation mobile station placed at each evaluation position and each base station, and corresponding to the resultant propagation loss, the reception power of the desired wave signal and the reception powers of the interference wave signals may be calculated so as to evaluate the communication quality at each evaluation position, and the evaluation of the communication quality may be repeated and the ratio that represents the number of evaluation results that do not satisfy a predetermined level is obtained.

In the area designing apparatus according to the first or second aspect, the communication quality at each evaluation position in an area that contains some of the plurality of evaluation positions may be evaluated, and a ratio that represents the number of evaluation results at the evaluation positions in the area do not satisfy a predetermined level may be obtained.

In the area designing apparatus according to the first or second aspect, the evaluation positions may be decided so that some of the plurality of evaluation positions are formed in a regular polygon shape.

The area designing apparatus according to the first or second aspect may comprise: means for displaying the communication quality at each evaluation position with visual information.

The area designing apparatus according to the first or second aspect may comprise: means for displaying the ratio that represents evaluation results that do not satisfy a predetermined level with the visual information.

The area designing apparatus according to the first or second aspect may comprise: means for inputting the traffic distribution information; means for storing the input traffic distribution information; and means for outputting the visual information.

These and other objects, features and advantages of the present invention will become more apparent in light of the following detailed description of the best mode embodiment thereof, as illustrated in the accompanying drawings.

DESCRIPTION OF PREFERRED EMBODIMENTS (The First Embodiment)

Figure 2:
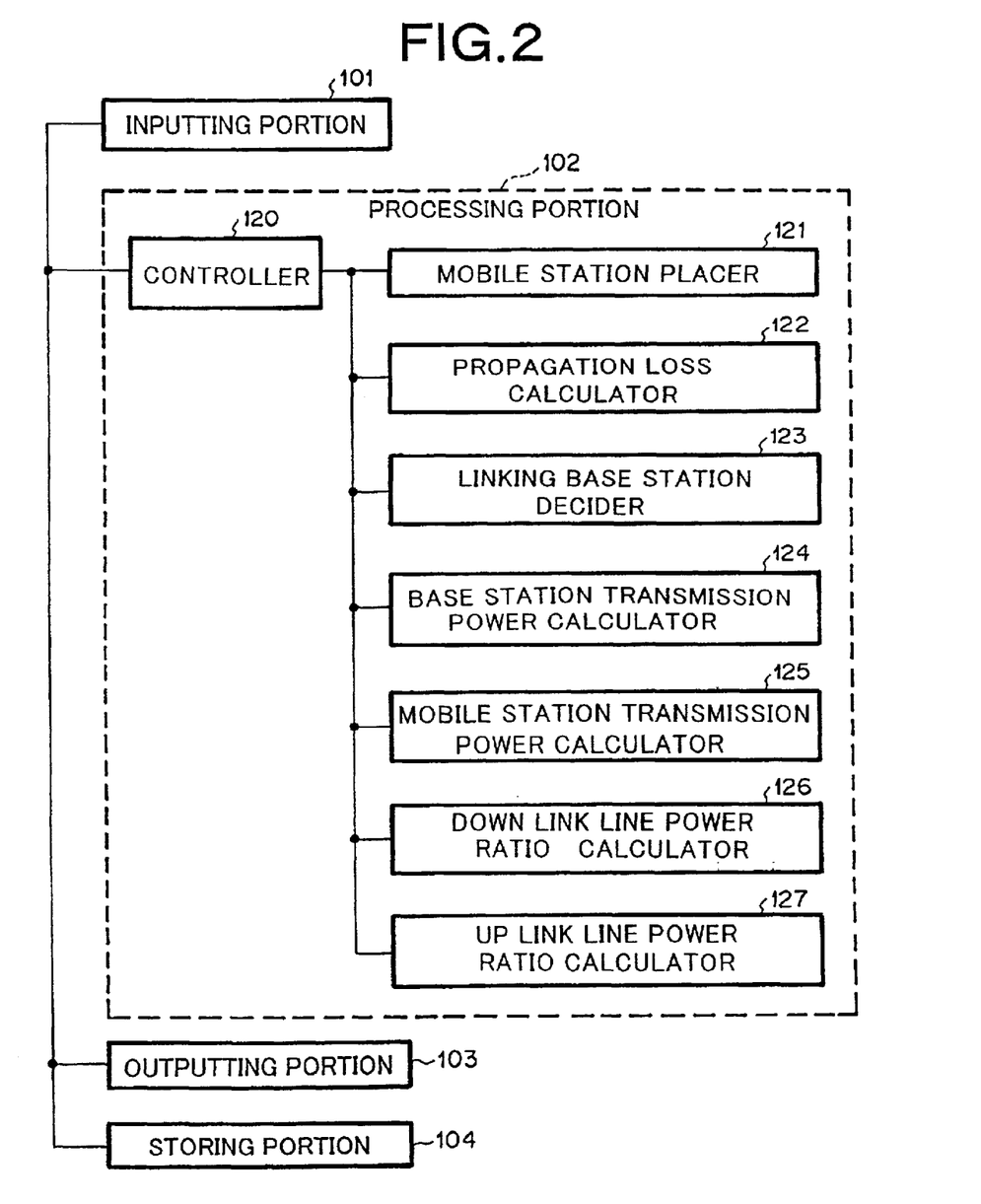
FIG. 2 is a block diagram showing the structure of an area designing apparatus according to a first embodiment of the present invention.

FIG. 2 is a block diagram showing the structure of an area designing apparatus for a mobile communication system according to the first embodiment of the present invention. The area designing apparatus shown in FIG. 2 comprises an inputting portion 101, a storing portion 104, a processing portion 102, and an outputting portion 103. The inputting portion 101 inputs information such as traffic occurrence range information, map information, traffic distribution information, evaluation position information, base station position information, and radio parameter information. The storing portion 104 stores each information that is input. The processing portion 102 obtains the reception quality at the evaluation position corresponding to each information stored in the storing portion 104. The outputting portion 103 outputs the obtained reception quality.

The processing portion 102 comprises a mobile station placer 121, a propagation loss calculator 122, and a linking base station decider 123. The mobile station placer 121 randomly places a plurality of communicating mobile stations on for example a real map corresponding to input traffic distribution information. The propagation loss calculator 122 selects a specified mobile station from the plurality of mobile stations placed on the map and calculates the propagation loss of a signal transmitted between the selected mobile station and the base station corresponding to the input map information. The linking base station decider 123 decides a base station that is radio linked to each of a plurality of mobile stations corresponding to the calculated propagation loss.

The processing portion 102 further comprises a base station transmission power calculator 124 and a mobile station transmission power calculator 125. The base station transmission power calculator 124 calculates the transmission power of a signal that the base station transmits to each of the plurality of mobile stations that is radio linked thereto corresponding to the position and propagation loss of each of the plurality of mobile stations. The mobile station transmission power calculator 125 calculates the transmission power of a signal that each of the plurality of mobile stations transmits to the base station that is radio linked thereto corresponding to the position and propagation loss of each of the plurality of mobile stations.

The processing portion 102 further comprises a down link line power ratio calculator 126, an up link line power ratio calculator 127, and a controller 120. The down link line power ratio calculator 126 calculates (desired wave power/interference wave power) of a signal of a down link line that is received by a communicating mobile station that is placed at any evaluation position. The up link line power ratio calculator 127 calculates (desired wave power/interference wave power) of a signal of an up link line that a base station receives from a mobile station that is placed at any evaluation position and that is radio linked thereto. The controller 120 controls the operation of the processing portion 102.

The traffic occurrence range information is information about the range in which a traffic occurs on a real map. The map information is altitude data of a land. The traffic distribution information is information about a traffic amount that occurs per unit size of each specified area. The evaluation position information is information about a plurality of evaluation positions designated for obtaining communication qualities.

The base station position information is information that represents the position of each of a plurality of base stations placed on a real map. The radio parameter information is information such as the antenna gain of an antenna disposed in each of the plurality of base stations, the maximum value of the transmission powers of the down link lines, and the maximum value of the transmission powers of the up link lines.

According to the first embodiment of the present invention, each of intersections of a plurality of lines at intervals of 100 meters in the south-north direction and a plurality of lines at intervals of 100 meters in the east-west direction are designated as evaluation positions on the map. Alternatively, evaluation positions may be placed so that some of them form regular polygons in for example a honeycomb shape or delta shape. The evaluation position information that is input through the inputting portion 101 can be freely changed by the user of the area designing apparatus such as the communication service provider.

Next, according to the first embodiment of the present invention, a method for evaluating the communication quality for a mobile communication system using the code division multiple access (CDMA), which uses one frequency band for each of an up link line and a down link line, will be described.

Figure 3:
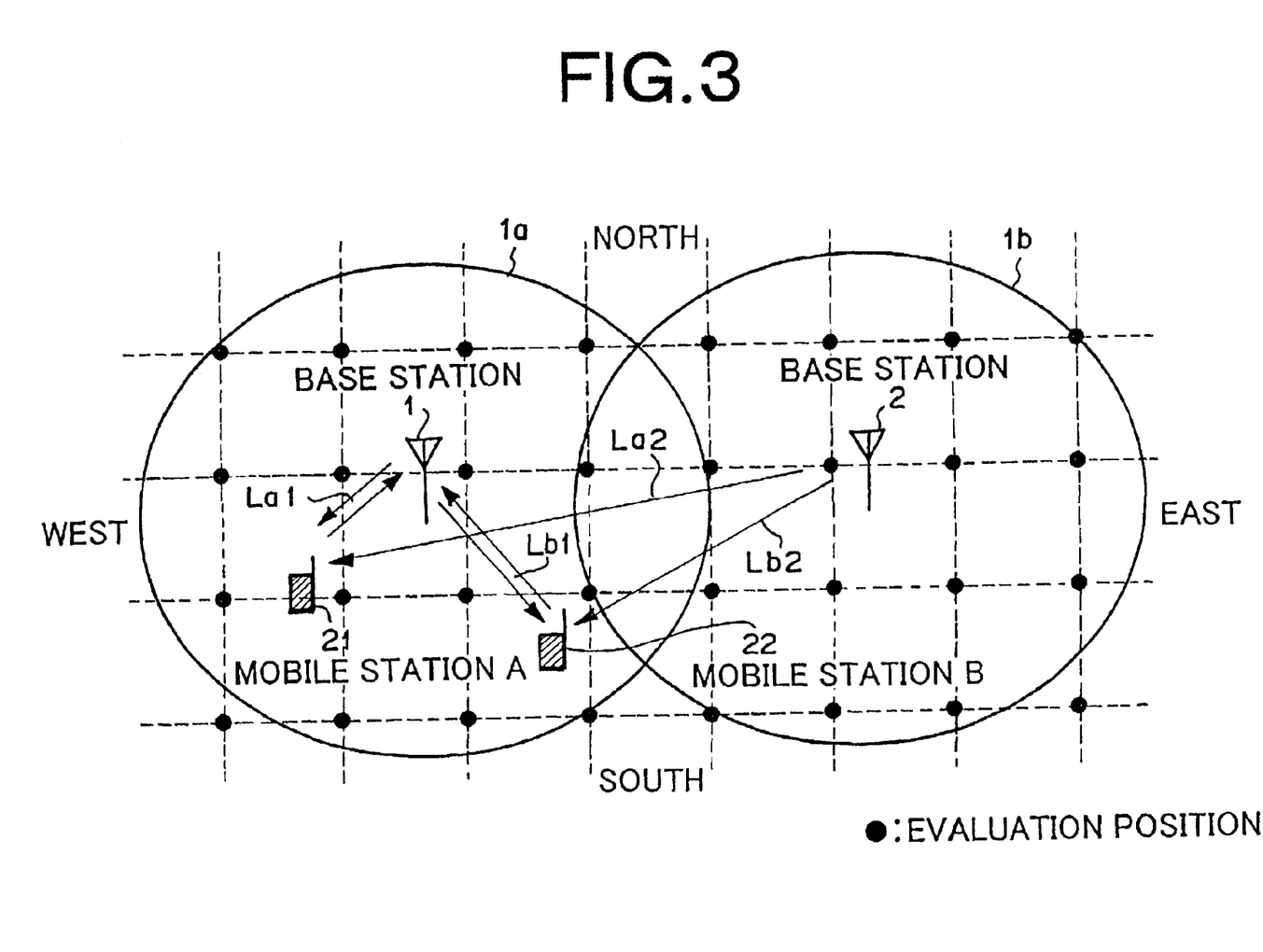
FIG. 3 is a schematic diagram for explaining the theory of the evaluation of the communication quality of a signal transmitted between each of a plurality of mobile stations and a base station, the evaluation being performed by an area designing apparatus shown in FIG. 2.

FIG. 3 is a schematic diagram for explaining the theory of the evaluation of the communication quality of a signal transmitted between each of a plurality of mobile stations and a base station, the evaluation being performed by the area designing apparatus shown in FIG. 2. FIG. 3 shows base stations 1 and 2 and mobile stations 21 and 22. The mobile stations 21 and 22 are placed in a radio zone 1a of the base station 1. In FIG. 3, reference numeral 1b represents a radio zone of the base station 2. The intersections of broken lines drawn in the east-west direction and the south-north direction represent evaluation positions. In reality, there are a plurality of base stations and mobile stations as well as the base stations 1 and 2 and the mobile stations 21 and 22 shown in FIG. 3.

In this example, the transmission power of a signal transmitted from the base station 1 to the mobile station 21 is denoted by Pba. The transmission power of a signal transmitted from the mobile station 21 to the base station 1 is denoted by Pma. The transmission power of a signal transmitted from the base station 1 to the mobile station 22 is denoted by Pbb. The transmission power of a signal transmitted from the mobile station 22 to the base station 1 is denoted by Pmb.

In this case, it is assumed that the reception power of a signal that each of the mobile stations 21 and 22 receives from the base station 1 is less than each of Pba and Pbb and that the propagation loss thereof varies corresponding to the distance between each of the mobile stations 21 and 22 and the base station 1, the position of each of the mobile stations 21 and 22, and so forth. In this example, the propagation loss between the base station 1 and the mobile station 21 is denoted by La1. The propagation loss between the base station 1 and the mobile station 22 is denoted by Lb1. The propagation loss between the base station 2 and the mobile station 21 is denoted by La2. The propagation loss between the base station 2 and the mobile station 22 is denoted by Lb2.

When the mobile stations 21 and 22 are in communication and they are radio linked to the base station 1, the area designing apparatus according to the first embodiment calculates the transmission power of a signal transmitted from the base station 1 to each of the mobile stations 21 and 22 and the transmission power transmitted from each of the mobile stations 21 and 22 to the base station 1.

Figure 4:
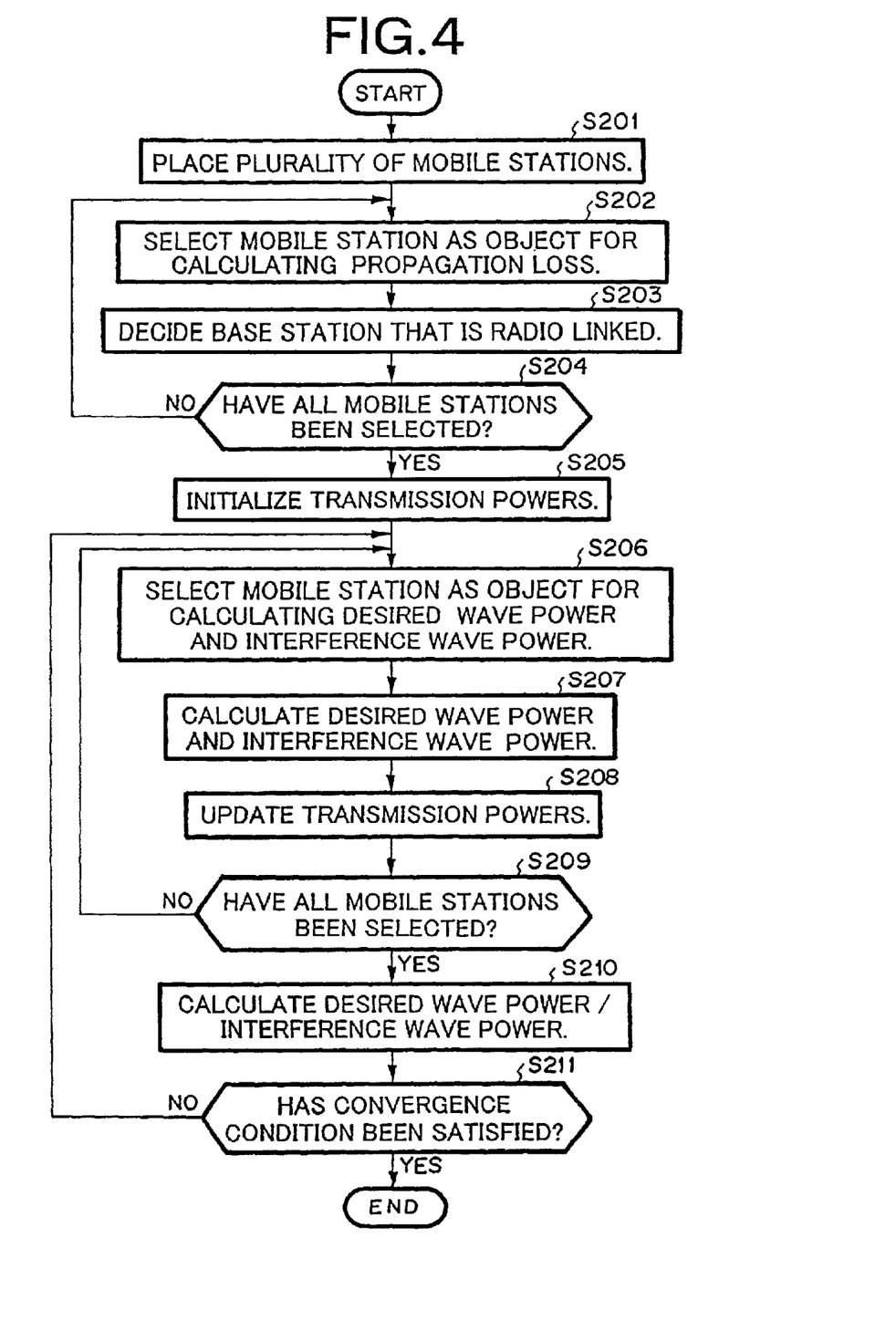
FIG. 4 is a flow chart showing the operation of the area designing apparatus shown in FIG. 2.
Figure 5:
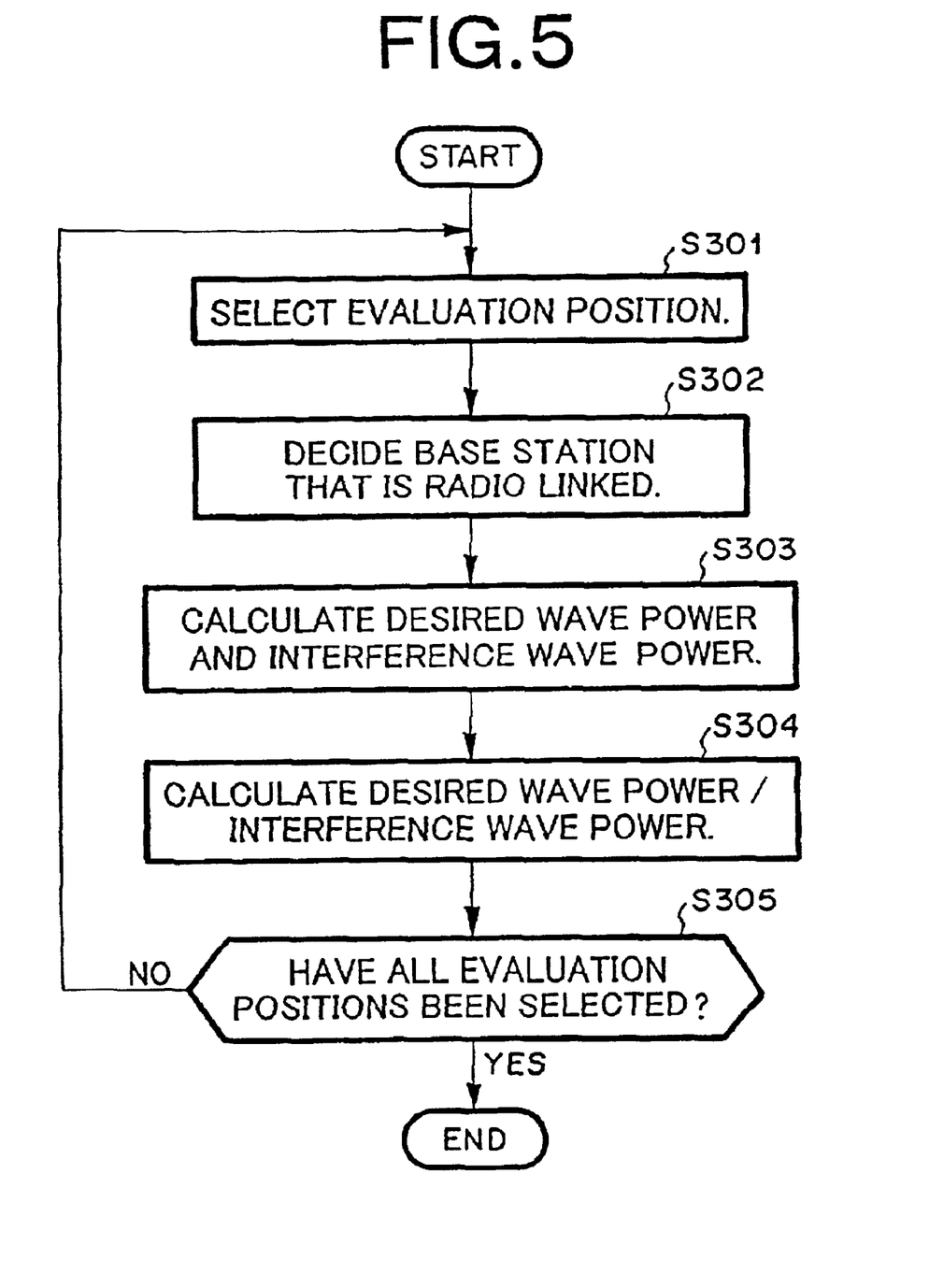
FIG. 5 is a flow chart showing the operation of the area designing apparatus shown in FIG. 2.

The area designing apparatus successively selects an evaluation position, calculates the desired wave power and the interference wave power of signals transmitted through each of an up link line and a down link line of each mobile station at the selected evaluation position, and obtains (each desired wave power/each interference wave power). In this case, the calculated results of the transmission powers of signals transmitted between the base station 1 and each of the mobile stations 21 and 22 are used. The communication quality is proportional to (each desired wave power/each interference wave power). When the ratio of evaluation positions at which a predetermined threshold value of (each desired wave power/each interference wave power) is not satisfied is large, the communication provider disposes a new base station and changes designed radio parameters so as to improve the communication quality FIGS. 4 and 5 are flow charts showing the operation of the area designing apparatus shown in FIG. 2. First of all, traffic occurrence range information, map information, traffic distribution information, evaluation position information, base station evaluation position information, radio parameter information, and so forth are input through the inputting portion 101, output to the storing portion 104, and temporarily stored to the storing portion 104.

In response to an instruction supplied from the controller 120, the mobile station placer 121 randomly places the plurality of mobile stations 21 and 22 on a map as shown in FIG. 3 corresponding to traffic distribution information stored in the storing portion 104 (at step S201).

Thereafter, the controller 120 selects a mobile station as an object to calculate a propagation loss (at step S202). In this example, the controller 120 selects the mobile station 21. The propagation loss calculator 122 calculates the propagation loss of a signal transmitted between the base station 1 and the mobile station 21 and the propagation loss of a signal transmitted between the base station 2 and the mobile station 21 corresponding to map information stored in the storing portion 104. The controller 120 decides a base station, between which and the mobile station 21 the propagation loss is minimum, as a base station that is radio linked to the mobile station 21 (at step S203). In this example, since the mobile station 21 is placed in the radio zone 1a of the base station 1, the controller 120 decides the base station 1 as a base station that is radio linked to the mobile station 21.

Thereafter, the flow advances to step S204. At step S204, the controller 120 determines whether or not the linking base station decider 123 has selected all the mobile stations. In this example, since the linking base station decider 123 has selected only the mobile station 21, the flow returns to step S202. At step S202, the linking base station decider 123 selects the mobile station 22. The linking base station decider 123 selects a base station, between which and the selected mobile station 22 the propagation loss is minimum (at step S202). The propagation loss calculator 122 calculates the propagation loss of a signal transmitted between the base station 1 and the mobile station 22 and the propagation loss of a signal transmitted between the base station 2 and the mobile station 22 and decides a base station to which the mobile station 22 is radio linked (at step S203). In this example, since the mobile station 22 is placed in the radio zone 1a of the base station 1, the linking base station decider 123 decides that the base station 1 is a base station to which the mobile station 22 is radio linked. Thereafter, the flow advances to step S204. At step S204, the controller 120 determines whether or not the linking base station decider 123 has selected all the mobile stations. In this example, since the linking base station decider 123 has selected both the mobile stations 21 and 22, the flow advances to step S205.

Steps S205 to S209 are executed by the base station transmission power calculator 124 and the mobile station transmission power calculator 125. At each step, the base station transmission power calculator 124 and the mobile station transmission power calculator 125 calculate the transmission power of each signal transmitted by the base station 1 and the mobile stations 21 and 22.

More definitely, the base station transmission power calculator 124 and the mobile station transmission power calculator 125 set the transmission powers Pba and Pbb and the transmission powers Pma and Pmb to initial values Pb0 and Pm0, respectively, so as to calculate the transmission powers Pba and Pbb of signals transmitted from the base station 1 to the mobile stations 21 and 22 through down link lines and the transmission powers Pma and Pmb of signals transmitted from the mobile stations 21 and 22 to the base station 1 through up link lines (at step S205).

Thereafter, the base station transmission power calculator 124 selects a mobile station as an object to calculate the reception power of a desired wave signal (desired wave power) and the reception power of an interference wave signal (interference wave power) transmitted to/from for example the base station 1 (at step S206). In this example, first of all, the base station transmission power calculator 124 selects the mobile station 21.

When the reception power of the desired wave signal that the mobile station 21 receives from the base station 1 is denoted by Dba and the reception power of the interference wave signal that the mobile station 21 receives is denoted by Uba, they can be expressed as follows.

$$Dba = Pba/La1$$

$$Uba = Pt1/La1 + Pt2/La2$$

(where Pt1 represents the sum of the transmission powers of signals transmitted from the base station 1 to mobile stations that are radio linked thereto minus the transmission power of a signal transmitted to the local station through a down link line (thus, Pt1=Pba+Pbb−Pba=Pbb); Pt2 represents the sum of transmission powers of signals transmitted from the base station 2 to mobile stations that are radio linked thereto (since there is no mobile station which is radio linked to the base station 2, Pt2=0).

When the reception power of the desired wave signal transmitted from the mobile station 21 to the base station 1 is denoted by Dma and the reception power of the interference wave signal transmitted from the mobile station 21 to the base station 1 is denoted by Uma, they can be expressed as follows.

$$Dma = Pma/La1$$

$$Uma = Pmb/Lb1$$

The base station transmission power calculator 124 and the mobile station transmission power calculator 125 calculate the desired wave powers Dba and Dma and the interference wave powers Uba and Uma (at step S207). The base station transmission power calculator 124 updates the transmission power Pba so that (Dba/Uba) approaches a predetermined value Rb. The mobile station transmission power calculator 125 updates Pma so that (Dma/Uma) approaches a predetermined value Rm (at step S208).

The updated results are stored to memories such as RAMs (not shown) of the base station transmission power calculator 124 and the mobile station transmission power calculator 125. When an updated transmission power is going to be greater than the predetermined maximum value, the transmission power may be restricted to the maximum value. Likewise, when the updated transmission power is going to be less than the predetermined minimum value, the transmission power may be restricted to the minimum value. Thereafter, the flow advances to step S209. Thereafter, the base station transmission power calculator 124 determines whether or not it has selected all the mobile stations. In this example, since the controller 120 has selected only the mobile station 21, the flow returns to step S206. At step S206, the base station transmission power calculator 124 selects the mobile station 22.

Thereafter, the flow advances to step S207. At step S207, the base station transmission power calculator 124 and the mobile station transmission power calculator 125 calculate the desired wave power Dbb (=Pbb/Lb1) of the mobile station 22, the interference wave power Ubb (=Pt1'/Lb1+ Pt2/Lb2) of the mobile station 22, the desired wave power Dmb (=Pmb/Lb1) of the signal transmitted from the mobile station 22 to the base station 1, and the reception power Umb (=Pma/La1) of the interference wave signal transmitted from the mobile station 22 to the base station 1.

At step S208, the base station transmission power calculator 124 updates the transmission power Pbb so that (Dbb/Ubb) that is the ratio of the calculated desired wave power and the calculated interference wave power approaches the predetermined value Rb. The mobile station transmission power calculator 125 updates the transmission power Pmb so that (Dmb/Umb) that is the ratio of the calculated desired wave power Dmb and the interference wave power Umb approaches the predetermined value Rm.

Thereafter, the flow advances to step S209. At step S209, the base station transmission power calculator 124 determines whether or not it has selected all the mobile stations. In this example, since the base station transmission power calculator 124 has selected all the mobile stations, the flow advances to step S210. At step S210, the base station transmission power calculator 124 and the mobile station transmission power calculator 125 calculate (Dba/Uba), (Dbb/Ubb), (Dma/Uma), and (Dmb/Umb) that are ratio of each desired wave power and each interference wave power.

As was described, since the following relations are satisfied:

$Uba=Pt1/La1+Pt2/La2$ $Pt1=Pba+Pbb-Pba=Pbb$ $Pt2=0,$ thus, the relation Uba=Pbb/La1 is satisfied.

In addition, since the relation Uma=Pmb/Lb1 is satisfied, when Pbb and Pmb are changed, the interference wave powers Uba and Uma of signals transmitted through a down link line and an up link line between the base station 1 and the mobile station 21 are changed corresponding thereto.

Thereafter, the controller 120 determines whether or not the ratios of the desired wave powers Dba, Dbb, Dma, and Dmb and the interference wave powers Uba, Ubb, Uma, and Umb, respectively, of signals transmitted through up link lines and down link lines between the base station 1 and each of the mobile stations 21 and 22 are within the permissible ranges around the predetermined values Rb and Rm (at step S211). In this example, the permissible ranges are for example ±5% around the predetermined values.

When there is a radio line whose power ratio deviates from the permissible ranges around the predetermined values, the controller 120 determines that the convergence condition is not satisfied. Thereafter, the flow returns to step S206. Thus, loop from step S206 to step S210 is repeated. Thereafter, the flow advances to step S211. At step S211, when there is no radio line whose power ratio deviates from the permissible ranges around the predetermined values, the controller 120 determines that the convergence condition is satisfied. The processing portion 102 stores the obtained Pba, Pbb, Pma, and Pmb to the storing portion 104 and completes the process shown in FIG. 4. However, when the transmission power of a radio line is the same as the predetermined maximum value or the predetermined minimum value, such radio line is excluded from the determination of the convergence condition at step S211. Thereafter, the flow advances to step S301 shown in FIG. 5.

The reason why a radio line whose transmission power is the same as the prescribed maximum or minimum power is excluded from the determination of the convergence condition is that there may be a case where the power ration do not converges within the permissible ranges around the predetermined value.

Steps S301 to S305 shown in FIG. 5 are executed by the down link line power ratio calculator 126 and the up link line power ratio calculator 127. More definitely, one evaluation position is selected from the radio zone 1a of the base station 1. It is assumed that a communicating mobile station (not shown) is placed as an evaluation mobile station at the evaluation position (at step S301).

In the same manner as steps S202 and S203, a base station that is radio linked to the evaluation mobile station is decided (at step S302). In addition, desired wave powers and the interference wave powers of signals transmitted through an up link line and a down link line between the decided base station and the selected evaluation mobile station are calculated (at step S303).

The desired wave powers are calculated with a predetermined maximum value of transmission powers of signals transmitted through the individual radio lines. The interference wave powers are calculated for example in the same manner as step S207.

Thereafter, (desired wave power/interference wave power) is calculated (at step S304). At step S305, it is determined whether or not all evaluation positions have been selected. When all the evaluation positions have not been selected, the flow returns to step S301. When all the evaluation positions have been selected, the process shown in FIG. 5 is completed. In such a manner, the ratio of the desired wave power and the interference wave power at each of all the evaluation positions is calculated.

At step S303, a desired wave power is calculated with a predetermined maximum value of transmission powers of individual radio lines. At step S304, with such a desired wave power, the power ration of (desired wave power/ interference wave power) is calculated. Thus, the power ratio is the maximum value corresponding to the maximum value in the permissible range of the transmission power. With the power ratio, the communication quality of a mobile station at each evaluation position can be evaluated.

In reality, the communication quality is proportional to the power ratio. Thus, using for example three threshold values, evaluated results of the communication qualities can be categorized into four ranks corresponding to the calculated power ratio. When the ranks of the communication qualities are correlated with colors, the user of the area designing apparatus of the communication provider or the like can visually know the regional distribution of ranks of the communication qualities.

The communication quality at each evaluation position in an area that contains some of a plurality of evaluation positions may be evaluated. The ratio of evaluation positions at which a predetermined communication quality is not satisfied may be calculated. The ratio may be displayed with visual information correlating with colors. Alternatively, the average of the ratios of desired wave powers and interference wave powers may be calculated.

For example, the distance between evaluation positions is designated corresponding to the distance between base stations. When the distance between base stations is around 1 km, it is preferred that the distance between evaluation positions is at most around 100 meters so as to allow service area information to be displayed in colors. In reality, the distance between evaluation positions may be designated in a range from 50 meters to 200 meters.

The generated visual information is output from the outputting portion 103. The communication provider or the like can increase the number of base stations and change the designated radio parameters corresponding to the visual information. In addition to the outputting portion 103, a displaying portion that displays the generated visual information may be disposed.

As was described above, according to the first embodiment of the present invention, while a mobile stations that are placed corresponding to traffic distribution information is communicating with base stations, an evaluation mobile station is temporarily placed at each of evaluation positions placed at intervals of a constant distance, so that the communication quality at each evaluation position is evaluated. Thus, the communication quality of the entire service area can be evaluated without a deviation while considering the influences of other radio lines.

In addition, according to the first embodiment of the present invention, since the communication quality at each evaluation position in an area that contains some of a plurality of evaluation positions is evaluated, the statistical reliability of the evaluated result is not affected by the number of mobile stations placed in each area corresponding to the traffic distribution information. Thus, the evaluated result of the communication quality with the constant statistical reliability can be obtained with a predetermined number of evaluation positions. In addition, visual information corresponding to the evaluated result can be generated.

(The Second Embodiment)

Figure 6:
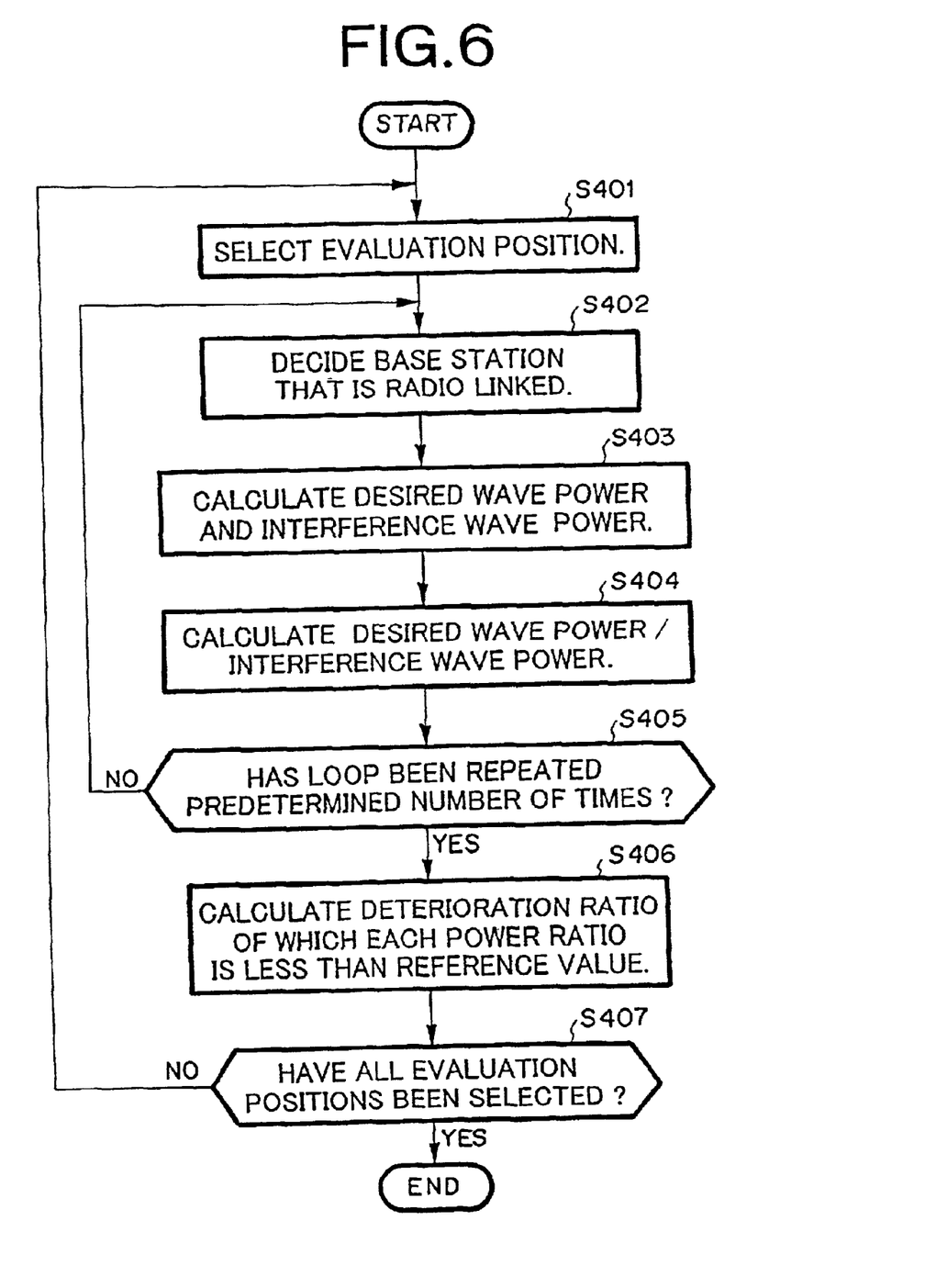
FIG. 6 is a flow chart showing the operation of an area designing apparatus according to a second embodiment of the present invention.

FIG. 6 is a flow chart showing the operation of an area designing apparatus according to the second embodiment of the present invention.

Steps shown in FIG. 6 are executed by the down link line power ratio calculator 126 and the up link line power ratio calculator 127. The structure of the area designing apparatus 6 according to the second embodiment is the same as the structure of the area designing apparatus shown in FIG. 2. Before the operation shown in FIG. 6 is performed, the operation shown in FIG. 4 is performed.

After steps S201 to S211 are executed like the first embodiment, one evaluation position is selected from the radio zone 1a of the base station 1. It is assumed that a communicating mobile station (not shown) is placed as an evaluation mobile station at the evaluation position (at step S401).

In the same manner as steps S202 and S203, a base station, between which and the evaluation mobile station the propagation loss is the minimum, is selected as a base station that is radio linked to the evaluation mobile station (at step S402). In addition, the desired wave powers and the interference waves powers of signals transmitted through an up link line and a down link line between the decided base station and the selected mobile station are calculated (at step S403).

According to the second embodiment, at steps S402 and S403, a random deviation amount is added to a propagation loss of a signal transmitted between the evaluation mobile station and the base station. The resultant propagation loss is used. This is because even if the propagation path between each base station and an evaluation mobile station is the same, a disturbing substance such as a building that is present on the propagation path affects the propagation loss. Corresponding to the resultant propagation loss, the base station that is radio linked to the evaluation mobile station may be changed and the desired wave power and the interference wave power may be varied.

Thereafter, (desired wave power/interference wave power) is calculated (at step S404). At step S405, it is determined whether or not the loop from step S402 to S404 has been repeated a predetermined number of times (for example, 100 times). When the determined result at step S405 represents that the loop has not been repeated the predetermined number of times, the flow returns to step S402 and steps S402 to S404 are repeated.

The random variation amount that is added to the propagation loss at step S402 is obtained using an independent random number whenever the loop is repeated. When the determined result at step S405 represents that the loop has been repeated the predetermined number of times, the flow advances to step S406. At step S406, the ratio of the number of times that (desired wave power/interference wave power) obtained at step S404 is less than a predetermined reference value to the number of times that is (desired wave power/interference wave power) is calculated is obtained.

Thereafter, the flow advances to step S407. At step S407, it is determined whether or not the loop from steps S401 to S406 has been executed for each of all the evaluation positions. When the determined result at step S407 represents that the loop from steps S401 to S406 has not been executed for all the evaluation positions, the flow returns to step S401. In contrast, when the determined result at step S407 represents that the loop from steps S401 to S406 has been executed for all the evaluation positions, the process shown in FIG. 6 is completed.

Like the first embodiment, the evaluated result may be output as visual information or displayed on a displaying portion.

As was described above, according to the second embodiment, the ratio of the desired wave power to the interference wave power is obtained for each of evaluation positions a predetermined number of times. The deterioration ratio of which each power ratio is less than the predetermined reference value is calculated. Thus, the statistical reliability of the deterioration ratio at each evaluation position becomes constant irrespective of the traffic density and so forth. Consequently, the deterioration ratio can be obtained for each area with a predetermined size with a constant statistical reliability.

As was described above, according to the present invention, the communication quality at each evaluation positions placed at intervals of any distance can be obtained while influences of signals transmitted and received between a plurality of mobile stations placed corresponding to an area distribution of a predicted traffic density and a base station are considered. In addition, the deterioration ratio can be obtained for each area having any size such as each evaluation position with a constant statistical reliability.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. An area-designing apparatus having processing means for simulating a CDMA mobile communication system, the processing means comprising:

means for placing a plurality of communicating mobile stations corresponding to traffic distribution information on a map;

means for deciding, for each mobile station, a base station to which the mobile station is radio-linked;

means for calculating transmission power of a signal that each base station transmits to each of the mobile stations that are radio-linked thereto so that a ratio of reception power of a signal to reception power of interferences converges to a predetermined value, said reception power of a signal being that of a signal that each mobile station receives from the base station radio-linked thereto, said reception power of interferences being that of interferences that the same mobile station receives from the base station radio-linked thereto and from each of the other base stations, converges to a predetermined value;

means for successively selecting, while each base station is transmitting the calculated transmission power signal, each of a plurality of evaluation positions on the map which are independent from positions at which the mobile stations are placed on the map; and, means for calculating reception power of a signal received by an additional evaluation mobile station placed on the map at each selected evaluation position, the signal being received from the base station that the additional evaluation mobile station is radio-linked thereto, and for calculating reception power of interferences received by the additional evaluation mobile station from all of the base stations including the base station to which the additional evaluation mobile station is radio-linked;

wherein communication quality at each evaluation position is evaluated corresponding to the calculated reception signal power and the calculated reception power of the interferences.

2. The area-designing apparatus as set forth in claim 1, wherein a random deviation amount is added to a propagation loss of a signal transmitted between the evaluation mobile station, placed at each evaluation position, and each base station, wherein, corresponding to the resultant propagation loss, the reception power of the signal and the reception power of the interferences are calculated so as to evaluate the communication quality at each evaluation position, and wherein the evaluation of the communication quality is repeated, and the ratio that represents the number of evaluation results that do not satisfy a predetermined level is obtained.

3. The area-designing apparatus as set forth in claim 1, wherein the communication quality at each evaluation position in an area that contains some of the plurality of evaluation positions is evaluated, and wherein a ratio that represents the number of evaluation results at the evaluation positions in the area that do not satisfy a predetermined level is obtained.

4. The area-designing apparatus as set forth in claim 1, wherein the evaluation positions are decided so that some of the plurality of evaluation positions are formed in a regular polygon shape.

5. The area-designing apparatus as set forth in claim 1, further comprising:

means for displaying, with visual information, the communication quality at each evaluation position.

6. The area-designing apparatus as set forth in claim 2, further comprising:

means for displaying, with visual information, the ratio that represents evaluation results that do not satisfy a predetermined level.

7. The area-designing apparatus as set forth in claim 1, further comprising:

means for inputting the traffic distribution information;

means for storing the input traffic distribution information; and, means for outputting visual information from the apparatus.

8. An area-designing apparatus having processing means for simulating a CDMA mobile communication system, the processing means comprising:

means for placing a plurality of communicating mobile stations so as to correspond to traffic distribution information on a map, the apparatus comprising:

means for deciding, for each mobile station, a base station to which the mobile station is radio-linked;

means for calculating transmission power of a signal that each mobile station transmits to the base station that is radio-linked thereto so that a ratio of a reception power of a signal to reception power of interferences converges to a predetermined value, said reception power of a signal being that of a signal that each base station receives from each mobile station radio-linked thereto, said reception power of interferences being that of interferences that the same base station receives from the other mobile stations;

means for successively selecting, while each mobile station is transmitting the calculated transmission power signal, each of a plurality of evaluation positions on the map which are independent from positions at which the mobile stations are placed on the map; and, means for calculating reception power of a signal received by the base station from an additional evaluation mobile station placed on the map at each selected evaluation position, the signal being received from the additional evaluation mobile station that the base station is radio-linked thereto, and for calculating reception power of interferences that the base station receives from mobile stations other than the additional evaluation mobile station;

wherein communication quality at each evaluation position is evaluated corresponding to the calculated reception signal power and the calculated reception power of the interferences.

9. The area-designing apparatus as set forth in claim 8, wherein a random deviation amount is added to a propagation loss of a signal transmitted between the evaluation mobile station, placed at each evaluation position, and each base station, wherein, corresponding to the resultant propagation loss, the reception power of the signal and the reception power of the interferences are calculated so as to evaluate the communication quality at each evaluation position, and wherein the evaluation of the communication quality is repeated, and the ratio that represents the number of evaluation results that do not satisfy a predetermined level is obtained.

10. The area-designing apparatus as set forth in claim 8, wherein the communication quality at each evaluation position in an area that contains some of the plurality of evaluation positions is evaluated, and wherein a ratio that represents the number of evaluation results at the evaluation positions in the area that do not satisfy a predetermined level is obtained.

11. The area-designing apparatus as set forth in claim 8, wherein the evaluation positions are decided so that some of the plurality of evaluation positions are formed in a regular polygon shape.

12. The area-designing apparatus as set forth in claim 8, further comprising:
means for displaying, with visual information, the communication quality at each evaluation position.

13. The area-designing apparatus as set forth in claim 9, further comprising:
means for displaying, with visual information, the ratio that represents evaluation results that do not satisfy a predetermined level.

14. The area-designing apparatus as set forth in claim 8, further comprising:
means for inputting the traffic distribution information;
means for storing the input traffic distribution information; and,
means for outputting visual information from the apparatus.

15. An area-designing method for simulating a CDMA mobile communication system, comprising steps of:
placing a plurality of communicating mobile stations on a map so as to correspond to traffic distribution information;
deciding, for each mobile station, a base station to which the mobile station is radio-linked;
calculating transmission power of a signal that each base station transmits to each of the mobile stations that are radio-linked thereto so that a ratio of reception power to reception power of interferences converges to a predetermined value, said reception power of a signal being that of a signal that each mobile station receives from the base station radio-linked thereto, said reception power of interferences being that of interferences that that the same mobile station receives from the base station radio-linked thereto and from each of the other base stations;
successively selecting, while each base station is transmitting the calculated transmission power signal, each of a plurality of evaluation positions on the map which are independent from positions at which the mobile stations have been placed on the map; and,
calculating a reception power of a signal received by an additional evaluation mobile station placed at each selected evaluation position, the signal being received from the base station that the additional evaluation mobile station is radio-linked thereto, and calculating reception power of interferences received by the additional evaluation mobile station from ail of the base stations including the base station to which the additional evaluation mobile station is radio-linked;
wherein communication quality at each evaluation position is evaluated corresponding to the calculated reception signal power and the calculated reception power of the interferences.

16. The area-designing method as set forth in claim 15, wherein a random deviation amount is added to a propagation loss of a signal transmitted between the additional evaluation mobile station, placed at each evaluation position, and each base station,
wherein, corresponding to the resultant propagation loss, the reception power of the signal and the reception power of the interferences are calculated so as to evaluate the communication quality at each evaluation position, and
wherein the evaluation of the communication quality is repeated, and the ratio that represents the number of evaluation results that do not satisfy a predetermined level is obtained.

17. The area-designing method as set forth in claim 15, wherein the communication quality at each evaluation position in an area that contains some of the plurality of evaluation positions is evaluated, and
wherein a ratio that represents the number of evaluation results at the evaluation positions in the area that do not satisfy a predetermined level is obtained.

18. The area-designing method as set forth in claim 15, wherein the evaluation positions are decided so that some of the plurality of evaluation positions are formed in a regular polygon shape.

19. The area-designing method as set forth in claim 15, further comprising:
a step of displaying, with visual information, the communication quality at each evaluation position.

20. The area-designing method as set forth in claim 16, further comprising:
a step of displaying, with visual information, the ratio that represents evaluation results that do not satisfy a predetermined level.

21. The area-designing method as set forth in claim 15, further comprising steps of:
inputting the traffic distribution information;
storing the input traffic distribution information; and,
outputting visual information on results from the method.

22. An area-designing method for a CDMA simulating mobile communication system, comprising steps of:
placing a plurality of communicating mobile stations on a map so as to correspond to traffic distribution information;
deciding, for each mobile station, a base station to which the mobile station is radio-linked;
calculating transmission power of a signal that each mobile station transmits to the base station that is radio-linked thereto so that a ratio of reception power of a signal to reception power of interferences converges to predetermined value, said reception power of a signal being that of a signal that each base station receives from each mobile station radio-linked thereto, said reception power of interferences being that of interferences that the same base station receives from the other mobile stations;
successively selecting, while each mobile station is transmitting the calculated transmission power signal, each of a plurality of evaluation positions on a map which are independent from positions at which the mobile stations have been placed on the map; and,
calculating reception power of a signal received by the base station from an additional evaluation mobile station placed at each selected evaluation position, the signal being received from the additional evaluation mobile station that the base station is linked thereto, and calculating reception power of interferences that the base station receives from mobile stations other than the additional evaluation mobile station;

wherein communication quality at each evaluation position is evaluated corresponding to the calculated reception signal power and the calculated reception power of the interferences.

23. The area-designing method as set forth in claim 22, wherein a random deviation amount is added to a propagation loss of a signal transmitted between the additional evaluation mobile station, placed at each evaluation position, and each base station, wherein, corresponding to the resultant propagation loss, the reception power of the signal and the reception power of the interferences are calculated so as to evaluate the communication quality at each evaluation position, and wherein the evaluation of the communication quality is repeated, and the ratio that represents the number of evaluation results that do not satisfy a predetermined level is obtained.

24. The area-designing method as set forth in claim 22, wherein the communication quality at each evaluation position in an area that contains some of the plurality of evaluation positions is evaluated, and wherein a ratio that represents the number of evaluation results at the evaluation positions in the area that do not satisfy a predetermined level is obtained.

25. The area-designing method as set forth in claim 22, wherein the evaluation positions are decided so that some of the plurality of evaluation positions are formed in a regular polygon shape.

26. The area-designing method as set forth in claim 22, further comprising:

a step of displaying, with visual information, the communication quality at each evaluation position.

27. The area-designing method as set forth in claim 23, further comprising:

a step of displaying, with visual information, the ratio that represents evaluation results that do not satisfy a predetermined level.

28. The area-designing method as set forth in claim 22, further comprising steps of:

inputting the traffic distribution information;

storing the input traffic distribution information; and, outputting visual information on results from the method.

* * * * *